(12) United States Patent
Aviani, Jr. et al.

(10) Patent No.: US 6,981,056 B1
(45) Date of Patent: Dec. 27, 2005

(54) WIDE AREA LOAD BALANCING OF WEB TRAFFIC

(75) Inventors: James A. Aviani, Jr., Santa Barbara, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 717 days.

(21) Appl. No.: 09/605,917

(22) Filed: Jun. 28, 2000

(51) Int. Cl.[7] .......................................... H06F 17/173
(52) U.S. Cl. ................ 709/239; 709/219; 709/226; 709/227; 709/235; 709/238
(58) Field of Search ................ 709/238, 239, 709/235, 219, 226, 227

(56) References Cited

U.S. PATENT DOCUMENTS

| 5,414,704 A | 5/1995 | Spinney |
| 5,488,412 A | 1/1996 | Majeti et al. |

(Continued)

FOREIGN PATENT DOCUMENTS

| WO | WO98/31107 | 7/1998 |

OTHER PUBLICATIONS

Akamai Technologies, Inc. -Global Internet Content Delivery-"How FreeFlow Works," webmaster@akamai.com 1999-2000.

(Continued)

Primary Examiner—Jeffrey C. Pwu
(74) Attorney, Agent, or Firm—Beyer Weaver & Thomas LLP

(57) ABSTRACT

Methods and apparatus are described for intelligently for intelligently routing a request to a device (e.g., replica or server). A packet is received (e.g., by the client's gateway router) from a client, and the packet has a destination identifier associated with a server. When the packet is a start packet, a tag is added to the start packet to indicate that the start packet should be forwarded to any replica that duplicates the data content of the server. The destination identifier of the start packet is stored for later use. After storing the destination identifier of the start packet and tagging the start packet, the start packet is sent to the server. When the start packet has a tag indicating that the start packet should be forwarded to any replica that duplicates the data content of the server, the start packet is encapsulated and sent to each replica associated with the server. A replica device then receives a start packet sent from the client to the server. The start packet is encapsulated. The encapsulated start packet is cracked to determine the client's address. When the replica device is active and not busy, an immediate acknowledgement packet is sent to the client in response to the received start packet. When a first acknowledgement packet associated with the start packet is received (e.g., at the client gateway router), a source identifier of the first acknowledgement packet is stored and associated with the stored destination identifier of the start packet. After storing and associating the source identifier of the first acknowledgement packet, the first acknowledgement packet is sent to the client. Subsequent packets (e.g., after the start and acknowledgement packets) are then sent between the client and sender of the first acknowledgement packet.

32 Claims, 13 Drawing Sheets

U.S. PATENT DOCUMENTS

| | | | |
|---|---|---|---|
| 5,506,987 | A | 4/1996 | Abramson et al. |
| 5,541,911 | A | 7/1996 | Nilakantan et al. ............ 370/13 |
| 5,586,121 | A | 12/1996 | Moura et al. |
| RE35,774 | E | 4/1998 | Moura et al. |
| 5,818,845 | A | 10/1998 | Moura et al. |
| 5,828,655 | A | 10/1998 | Moura et al. |
| 5,859,852 | A | 1/1999 | Moura et al. |
| 5,872,773 | A | 2/1999 | Katzela et al. |
| 5,892,903 | A | 4/1999 | Klaus |
| 5,946,047 | A | 8/1999 | Levan |
| 5,946,048 | A | 8/1999 | Levan |
| 5,950,205 | A | 9/1999 | Aviani, Jr. |
| 5,953,335 | A | 9/1999 | Erimli et al. |
| 5,956,346 | A | 9/1999 | Levan |
| 5,959,660 | A | 9/1999 | Levan |
| 5,959,968 | A | 9/1999 | Chin et al. |
| 5,959,997 | A | 9/1999 | Moura et al. |
| 5,989,060 | A | 11/1999 | Coile et al. |
| 6,006,266 | A | 12/1999 | Murphy et al. |
| 6,016,388 | A | 1/2000 | Dillon |
| 6,052,718 | A | 4/2000 | Gifford |
| 6,097,882 | A | 8/2000 | Mogul ................... 395/200.31 |
| 6,182,139 | B1 * | 1/2001 | Brendel ...................... 709/226 |
| 6,247,054 | B1 * | 6/2001 | Malkin ....................... 709/225 |
| 6,345,294 | B1 | 2/2002 | O'Toole et al. |
| 6,415,323 | B1 * | 7/2002 | McCanne et al. ........... 709/225 |
| 6,470,389 | B1 * | 10/2002 | Chung et al. ............... 709/227 |
| 6,671,259 | B1 * | 12/2003 | He et al. .................... 370/238 |
| 6,691,165 | B1 * | 2/2004 | Bruck et al. ................ 709/227 |
| 6,735,631 | B1 * | 5/2004 | Oehrke et al. .............. 709/226 |
| 2001/0042105 | A1 * | 11/2001 | Koehler et al. ............. 709/217 |

OTHER PUBLICATIONS

Digital Island, Inc. -e-Business Without Limits-, "Enabling Technologies," http://www.digisle.net. No date.

Internap, "Preferred Collocation Services," http://www.internap.com Copyright © 2001 Internap Network Services Corporation.

Eager et al., "Adaptive Load Sharing in Homogeneous Distributed Systems," IEEE, Transactions on Software Engineering, vol. Se-12, No. 5, May 1986, PP 662-675.

Meyer, et al., Request For Comments No. 2026, entitled, "Generic Routing Encapsulation (GRE)," Jan., 2000, Internet Engineering Task Force, 9 pages.

Mockapetris, P., Request For Comments No. 1034, entitled, "Domain Names—Concepts and Facilities," Nov., 1987, Internet Engineering Task Force, 31 pages.

Information Sciences Institute, Request for Comments No. 793, entitled, "Transmission Control Protocol—DARPA Internet Program—Protocol Specification," Sep., 1981, Internet Engineering Task Force, 49 pages.

David M. Gifford, "Replica Routing," U.S. Appl. No. 09/472,964, filed Dec. 28, 1999, 37 Pages.

Johnson et al., "Dynamic Server Organization," U.S. Appl. No. 09/294,837, filed Apr. 19, 1999, 42 Pages.

Lu et al., "Automatic Network Addresses Assignment and Translation Interference," U.S. Provisional application No. 60/160,535, filed Oct. 20, 1999, 127 Pages.

Lu et al., "Method and Apparatus for Automatic Network Address Assignment," U.S. Provisional application No. 60/178,063, filed Jan. 24, 2000, 74 Pages.

Johnson et al., "Method and Apparatus for Determining a Network Topology in the Presence of Network Address Translation," U.S. Provisional application No. 60/178,062, filed Jan. 24, 2000, 32 Pages.

Toole et al., "Fast-Changing Network Status and Load Monitoring and Feedback," U.S. Provisional application No. 60/177,985 filed Jan. 25, 2000, 20 Pages.

Kirk Johnson, "A Method and Apparatus for Minimalist Approach to Implementing Server Selection," U.S. Provisional application No. 60/177,415, filed Jan. 21, 2000, 39 Pages.

* cited by examiner

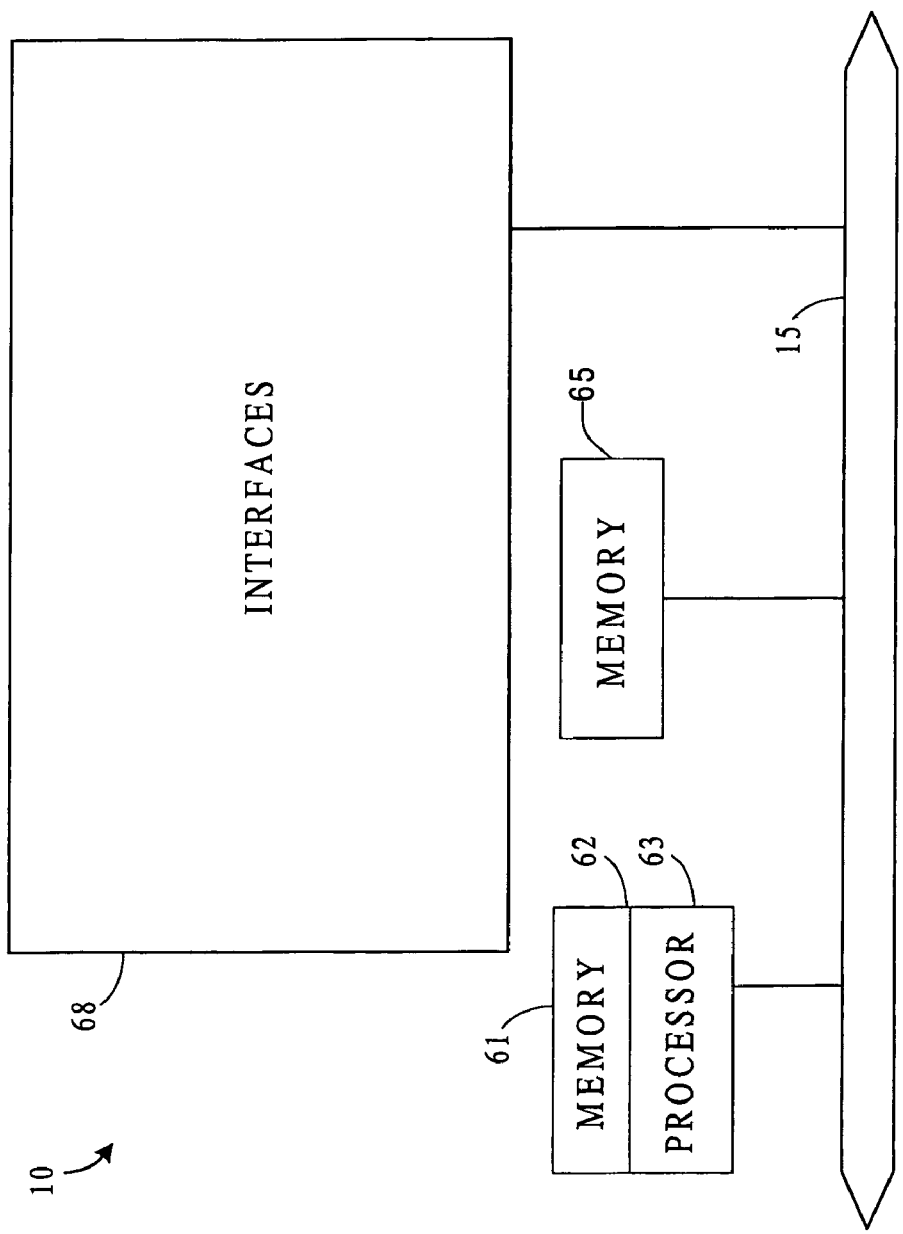

WIDE AREA LOAD BALANCING OF WEB TRAFFIC

FIELD OF THE INVENTION

The present invention relates to transmission of data in a network environment. More specifically, the present invention relates to methods and apparatus for improving the efficiency with which data are transmitted over the Internet. Still more specifically, the present invention relates to methods and apparatus for transparently redirecting network traffic to a selected replica of particular web content that is located closest to a client that is requesting such web content.

BACKGROUND OF THE INVENTION

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy."

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

Unfortunately, interaction with such proxy servers is not transparent, requiring each end user to select the appropriate proxy configuration in his or her browser to allow the browser to communicate with the proxy server. For the large ISPs with millions of customers there is significant overhead associated with handling tech support calls from customers who have no idea what a proxy configuration is. Additional overhead is associated with the fact that different proxy configurations must be provided for different customer operating systems. The considerable economic expense represented by this overhead offsets the benefits derived from providing accelerated access to the World Wide Web. Another problem arises as the number of WWW users increases. That is, as the number of customers for each ISP increases, the number of proxy servers required to service the growing customer base also increases. This, in turn, presents the problem of allocating packet traffic among multiple proxy servers.

Another technique for increasing the efficiency with which data requests are serviced is described in commonly assigned, copending U.S. patent application Ser. No. 08/946,867 for METHOD AND APPARATUS FOR FACILITATING NETWORK DATA TRANSMISSIONS filed Oct. 8, 1997, the entirety of which is incorporated herein by reference for all purposes. The invention described in that copending application represents an improvement over the proxy server model which is transparent to end users, high performance, and fault tolerant. By altering the operating system code of an existing router, the router is enabled to redirect data traffic of a particular protocol intended for a specified port, e.g., TCP with port 80, to one or more caching engines connected to the router via an interface having sufficient bandwidth such as, for example, a 100baseT interface. If there are multiple caching engines connected to the cache-enabled router, the router selects from among the available caching engines for a particular request based on a simple algorithm according to which a particular group of addresses is associated with each caching engine.

The caching engine to which the request is re-routed "spoofs" the requested destination platform and accepts the request on its behalf via a standard TCP connection established by the cache-enable router. If the requested information is already stored in the caching engine, i.e., a cache "hit" occurs, it is transmitted to the requesting platform with a header indicating its source as the destination platform. If the requested information is not in the caching engine, i.e., a cache "miss" occurs, the caching engine opens a direct TCP connection with the destination platform, downloads the information, stores it for future use, and transmits it to the requesting platform. All of this is transparent to the user at the requesting platform which operates exactly as if it were communicating with the destination platform. Thus, the need for configuring the requesting platform to suit a particular proxy configuration is eliminated along with the associated overhead. Moreover, traffic may be easily allocated among as many caching engines as become necessary. Thus, content caching provides a way to compensate for the bandwidth limitations discussed above.

Another specific embodiment of a packet redirection protocol which may be used to implement such a network caching technique is described in copending, commonly assigned, U.S. Provisional Patent Application No. 60/168,862 for METHOD AND APPARATUS FOR REDIRECT- ING NETWORK TRAFFIC filed Dec. 2, 1999, the entirety of which is incorporated herein by reference for all purposes. According to a specific embodiment described in that application, the network caches have the capability of determining that particular redirected packets should be transmitted back to the redirecting router and reinserted into the original traffic flow. This may be done in a manner transparent to the source or destination of the packets. An example of a case in which packets would need to be reinserted in the original flow might be where the cache recognizes the source and destination pairs identified by the packets as corresponding to a connection requiring IP-based authentication. Another example would be where the cache is overloaded and is currently unable to handle all of the redirected traffic.

A technique conceptually related to content caching referred to as content co-location has also been developed to provide faster access to certain types of data. That is, a large amount of Internet content resides on machines in the U.S. Client machines in remote geographic locations such as New Zealand or Australia typically have two ways of retrieving such content, i.e., via terrestrial links (bidirectional and fast, but expensive) and satellite links (mostly unidirectional and relatively cheap, but slow).

Content co-location provides one way to facilitate faster access to such content for geographically remote users. According to this technique, servers are provided in the geographically remote areas which store at least some of the content of the original site, e.g., image files. Akamai and Sandpiper provide such "co-loc" facilities to content providers. When a client requests a page containing such objects, the html refers to the objects by object names which correspond to the co-loc provider. These object names are then resolved by the client's browser to an IP address corresponding to the closest co-loc facility.

While content co-location techniques have proven to be relatively effective, browsers must constantly perform the object name resolution when parsing ordinary html to access the correct co-location facility. Thus, the clients must configure their own browser to work with specific replicas for various content providers. That is, redirection of traffic from a client to a replica is not transparent. This configuration task may prove difficult or impossible, as well as time-consuming to the client. Additionally, there are no efficient mechanisms for determining which replica is closest to a particular client. For example, when a content provider expands its number of replicas within the field, each client's browser would have to be updated to determine which replica is the closest.

Therefore, there is a need for mechanisms for efficiently and transparently routing requests from a client to a closest replica upon which the requested object is located.

SUMMARY OF THE INVENTION

Accordingly, the present invention provides an apparatus and method for intelligently routing a request from a client to a selected device (e.g., replica or server). Mechanisms are also provided for intelligently and transparently passing traffic back and forth between the client and the selected device once a connection is established.

In one aspect, a method of facilitating redirection of traffic between a server and a client to between the client and a selected replica is disclosed. A packet is received from a client, and the packet has a destination identifier associated with a server. When the packet is a start packet, a tag is added to the start packet to indicate that the start packet should be forwarded to any replica that duplicates the data content of the server. The destination identifier of the start packet is stored for later use. After storing the destination identifier of the start packet and tagging the start packet, the start packet is sent to the server. When a first acknowledgement packet associated with the start packet is received, a source identifier of the first acknowledgement packet is stored and associated with the stored destination identifier of the start packet. After storing and associating the source identifier of the first acknowledgement packet, the first acknowledgement packet is sent to the client.

Prior to storing and associating the source identifier of the first acknowledgement packet, the first acknowledgement packet is cracked to obtain the source identifier when the first acknowledgement packet has been encapsulated. The cracked packet is then encapsulated with a source address associated with the packet prior to being cracked. The encapsulated first acknowledgement packet is sent to the client. In a further implementation, when a subsequent packet associated with the start packet is received that is not a start packet or an acknowledgement packet, the destination identifier of the subsequent packet is replaced with a source identifier of the cracked acknowledgement packet associated with the subsequent packet when the subsequent packet originates from the client. Alternatively, the subsequent packet is encapsulated with a destination identifier equal to the source address associated with the acknowledgement packet prior to being cracked. The subsequent packet is forwarded to its destination.

In another implementation, the invention pertains to a computer system operable to facilitate redirection of traffic between a server and a client to between the client and a selected replica. The computer system includes a memory and a processor coupled to the memory. At least one of the memory and the processor are adapted to provide one or more of the above described method operations. In yet another implementation, the invention pertains to a computer program product for facilitating redirection of traffic between a server and a client to between the client and a selected one from a plurality of replicas. The computer program product includes at least one computer readable medium and computer program instructions stored within the at least one computer readable product configured to cause a processing device to provide at least one or more of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 7 is a diagrammatic representation of a router in accordance with one embodiment of the present invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
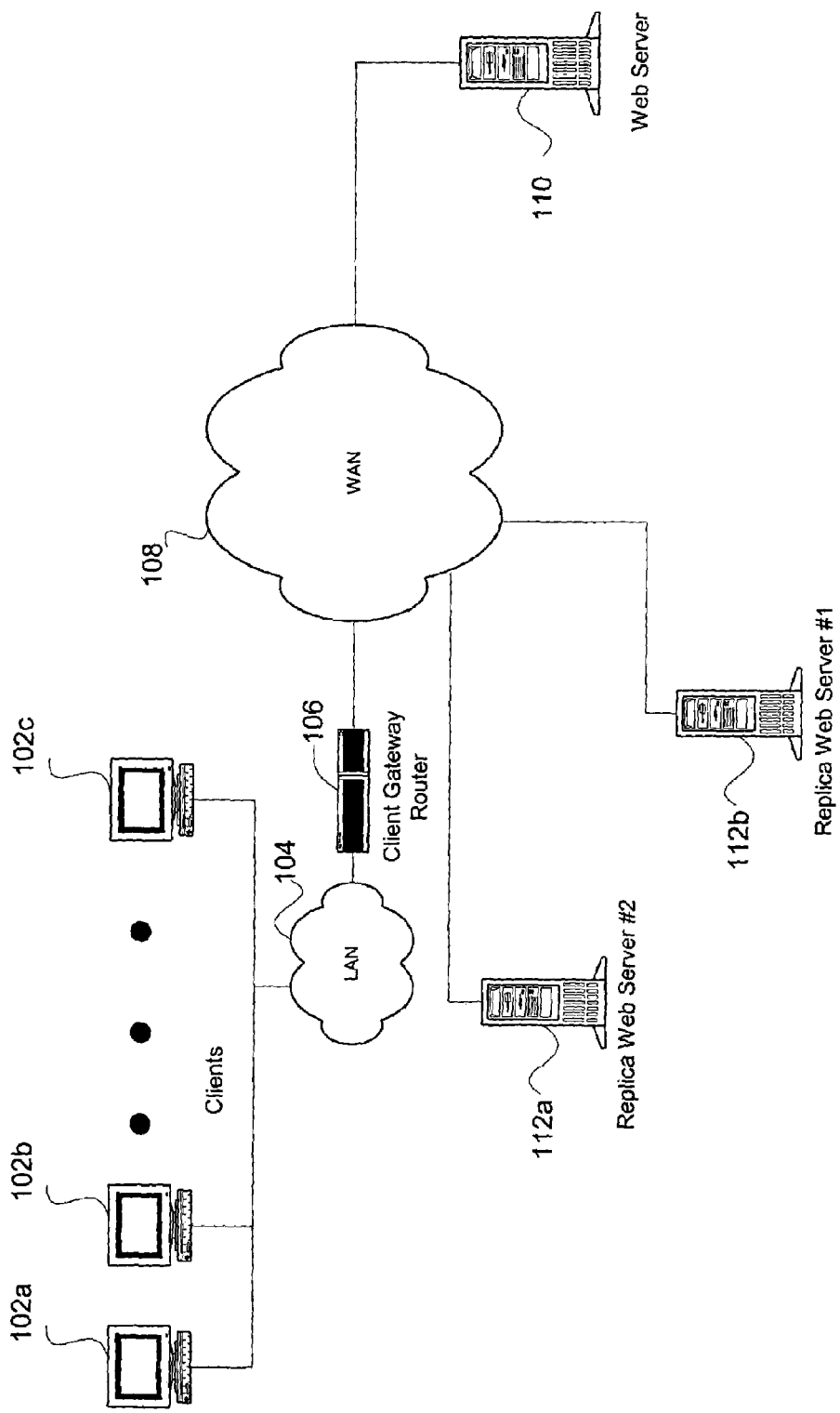
FIG. 1 is a network diagram illustrating a client, server, and two replicas according to a specific embodiment of the present invention.

FIG. 1 is a simplified network diagram which will be used in conjunction with the flowcharts of FIGS. 2 through 6C to describe specific embodiments of the present invention. As shown, a plurality of client machines 102 which are resident on a local area network (LAN) 104 communicate via a gateway router 106 and wide area network (WAN) 108, e.g., the internet, with main web server 110. Of course, some or all of the clients 102 may communicate with the router 106 through various other configurations, rather than through a LAN. For example, a client may be coupled directly to the router 106 or there may be one or more intermediate routers between a client 102 and the router 106.

The main web server 110 may be associated with a plurality of replica web servers 112. Each replica generally replicates at least a portion of the content on web server 110. Each replica server 112 is preferably located near a significant portion of clients that typically access the main web server 110. In general terms, the present invention enables clients to access a replica web server (or the main web server itself) that is located closest to such client. For example, if client 102a and replica 112a are both located in Europe, replica 112b is located in Japan, and the main web server in the United States, the client accesses web content from replica 112a.

Figure 2:
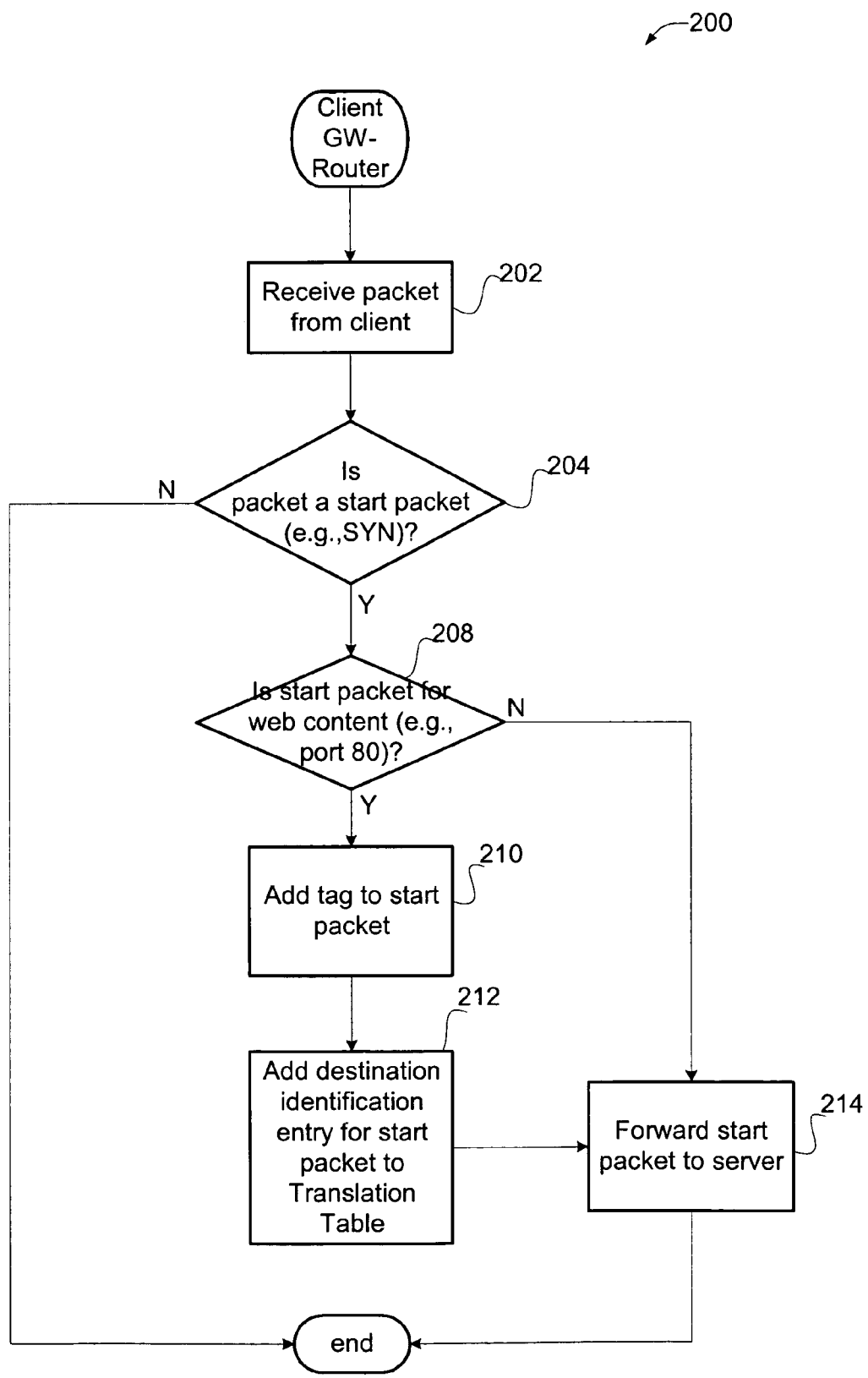
FIG. 2 is a flowchart illustrating a procedure performed by the client gateway router in accordance with one embodiment of the present invention.

FIG. 2 is a flowchart illustrating a procedure 200 performed by the client gateway router 106 in accordance with one embodiment of the present invention. Although this procedure 200 is described as occurring on the client's gateway router, of course, it may be implemented on any suitable device associated with the client, such as any intermediate router or the client itself. In the illustrated embodiment, the client gateway router 106 receives a packet from the client 102a in operation 202. It is then determined whether the packet is a start packet in operation 204. This operation may be performed in any suitable manner depending upon the particular protocol used by the packet. For example, it is determined whether the start packet is in the form of a SYN packet when using TCP protocol.

It may then be determined whether the start packet is associated with web content data. In one embodiment, it is determined whether the start packet's destination port is equal to port 80, which is typically used for web traffic. Of course, the present invention may be implemented on other types of data, in addition to web content data. Thus, the technique illustrated in FIG. 2 may determine whether the start packet is associated with other types of data. Alternatively, this determination operation may be eliminated altogether. In the illustrated embodiment, when it is determined that the start packet is associated with web content site in operation 208, a tag is then added to the start packet. The tag may be any suitable format for indicating that the start packet may be redirected to a selected replica associated with the destination server 110. For example, an option byte is added to the start packet's TCP header. The option byte indicates one of two states: redirection is permissible or redirection is not permissible. A destination identifier entry for the start packet is then added to a Translation Table in operation 212. For example, the start packet's destination IP address (e.g., the address of destination server 110) is added to the Translation Table. The tagged start packet is then forwarded to the server 110 in operation 214.

If the packet is not a start packet or the start packet is not destined for a web content site, a tag is not added to the start packet and an entry is not added to the translation table in operations 210 and 212, respectively. Several embodiments for handling a packet that is not a start packet are described further below with reference to FIGS. 6A through 6C. If the packet is a start packet but is not destined for a web content site, the start packet is merely forwarded to the destination server in operation 214.

Figure 3:
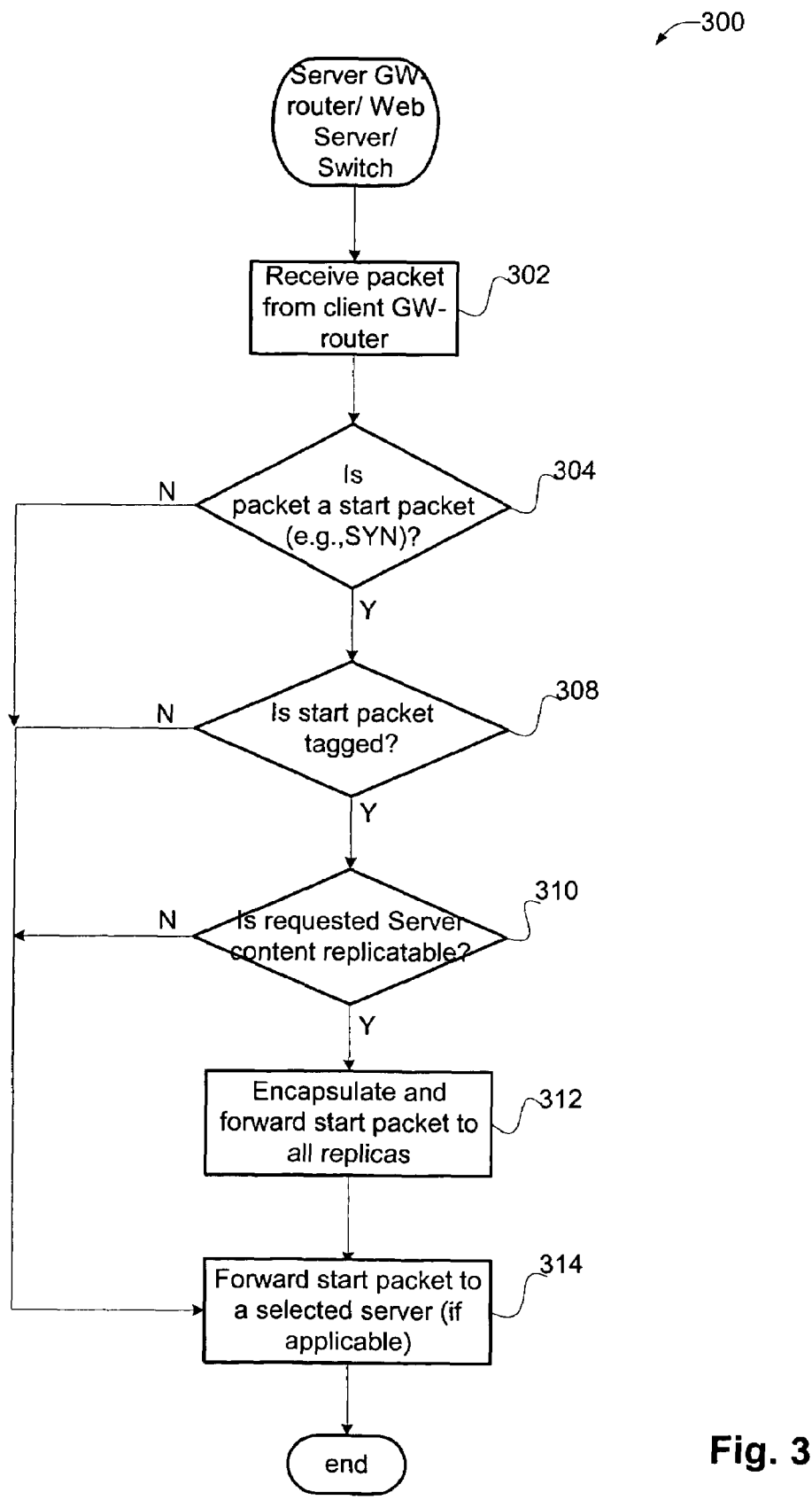
FIG. 3 is a flow chart illustrating a procedure implemented on the server's gateway router, the server's switch, or the web server itself, in accordance with one embodiment of the present invention.

FIG. 3 is a flow chart illustrating a procedure 300 implemented on the server's gateway router, the server's switch, or the web server itself, in accordance with one embodiment of the present invention. Initially, the packet that was forwarded from the client gateway router is received in operation 302. It is then determined whether the packet is a start packet in operation 304. If the packet is a start packet, it is then determined whether the start packet has a tag indicating that the start packet may go to a plurality of replicas (e.g., the start packet was tagged by the client gateway router) in operation 308.

If the packet is tagged, it is then determined whether the requested server data is replicateable in operation 310. Any suitable factors may be utilized to divide data into replicatable and non-replicatable data. In one embodiment, static data is replicatable, while dynamic data is not. When a switch that is receiving the start packet is associated with a plurality of servers, the servers may be divided into static content servers and dynamic content servers. In this configuration, each of the static content servers may have associated replicas that duplicate the static server's content. When a start packet is destined for a static content server that may have one or more associated replicas, it is then determined that the requested server data is replicatable.

If the requested server content is replicateable, the start packet is encapsulated and forwarded to all replicas associated with the destination server in operation 312. For example, a web server source address and replica destination address are added to the packet header. Within the start packet header, the original client source address and web server source address are now buried behind the web server source address and replica destination address. Additionally, if the packet has not already been received by a web server, the start packet is forwarded to a selected server in operation 314. For example, a switch that is associated with a plurality of web servers may initially receive the start packet and then determine which server will ultimately receive the start packet. The selection may be based on any suitable parameters, such as traffic load and requested data content. The start packet is then forwarded to the selected server in operation 314. Of course, prior to forwarding the start packet to the selected server, the start packet is encapsulated with a switch source address (or gate-way router source address) and a selected server destination address.

If the packet is not a tagged start packet or the requested server content is not replicateable, the start packet is merely forwarded to the selected server (if the start packet has not already been received by the server) in operation 314. For example, the start packet is encapsulated with a switch source address (or gate-way router source address) and a selected server destination address. Of course, if the start packet is already at the destination web server, it is not forwarded. The procedure 300 then ends.

Figure 4A:
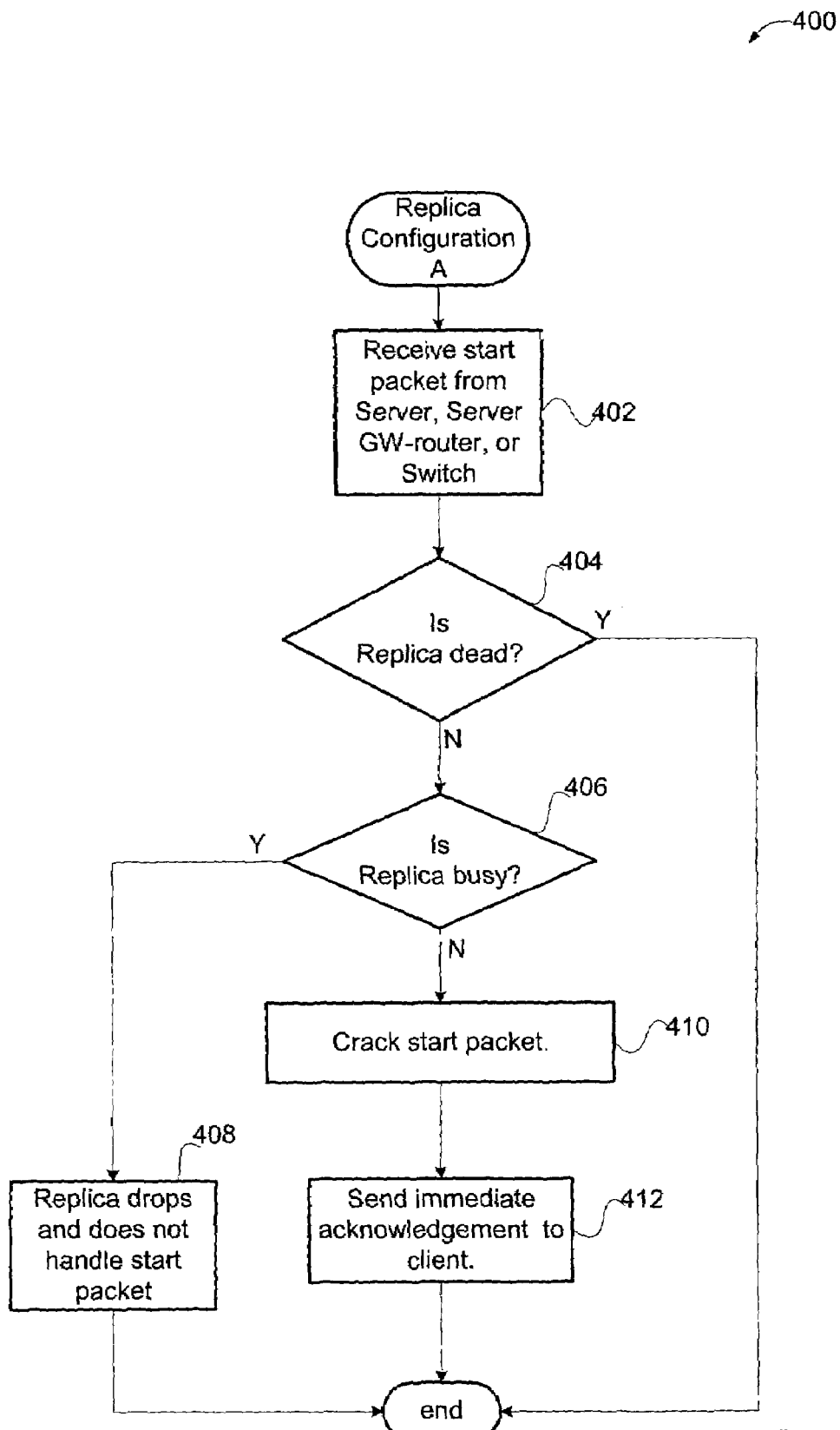
FIG. 4A is a flowchart illustrating a procedure implemented on a replica in accordance with a first embodiment (herein referred to as configuration A) of the present invention.

FIG. 4A is a flowchart illustrating a procedure 400 implemented on each replica in accordance with a first embodiment (herein referred to as configuration A) of the present invention. Initially, a start packet is received from either the web server, the server's gateway router, or web server's switch in operation 402. If the replica is dead or inactive (i.e., operation 404), nothing happens. If the replica is active but busy in operation 406, the replica then drops the start packet and accordingly does not handle the start packet in operation 408.

However, if the replica is not busy or dead, the start packet is then cracked in operation 410. When the start packet is cracked, the original client source address and server destination address are revealed. For example, the server's gate way router source address (or switch or web server) is removed from the header to uncover the underlying client source address and server destination address. The replica may then send an immediate acknowledgment to the client in operation 412. The configuration A replica procedure 400 then ends.

Figure 5A:
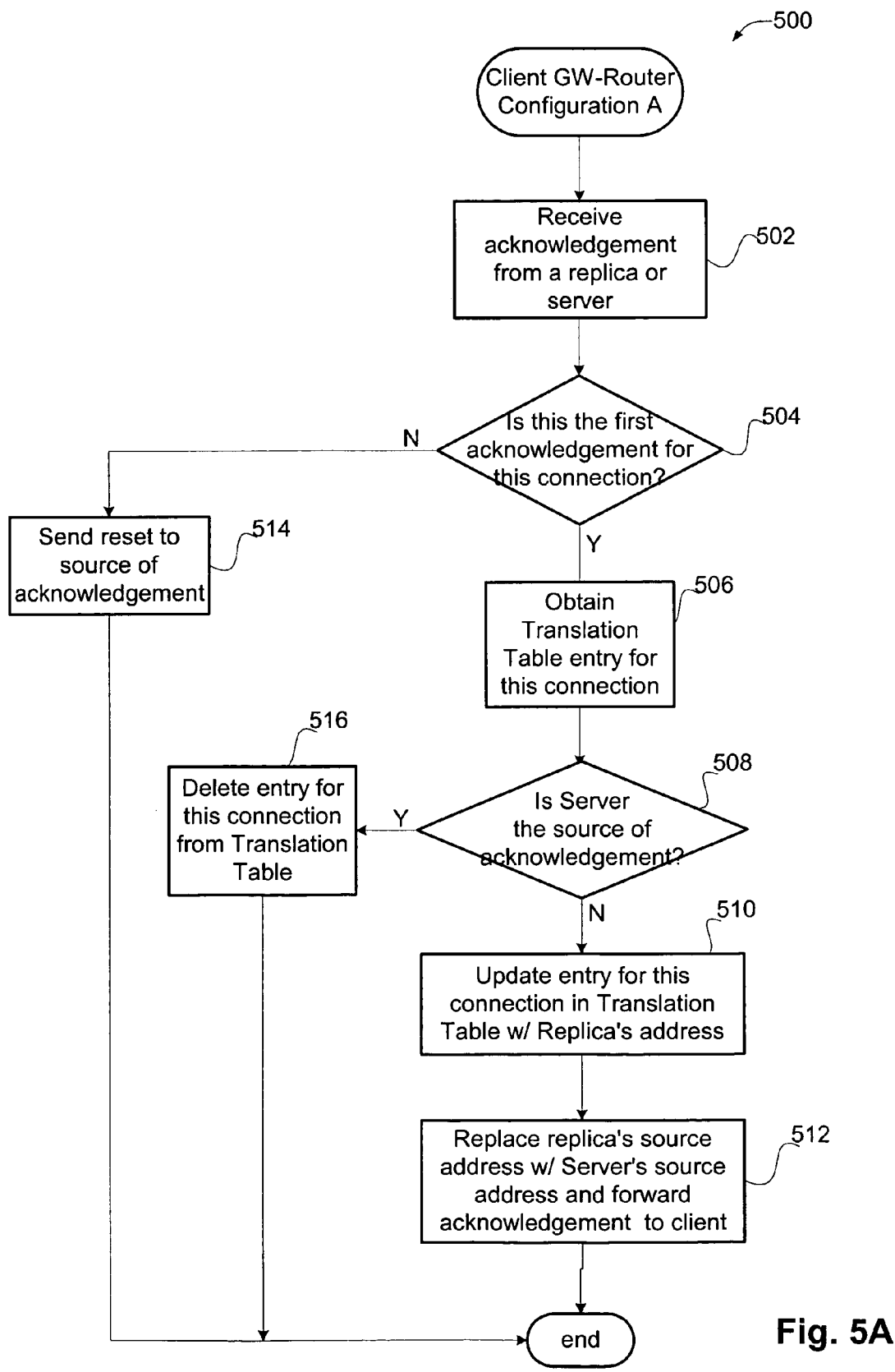
FIG. 5A is a flowchart illustrating a procedure implemented on the client gateway router in accordance with the first embodiment (configuration A) of the present invention.

FIG. 5A is a flowchart illustrating a procedure 500 implemented on the client gateway router in accordance with the first embodiment (configuration A) of the present invention. Initially, an acknowledgment is received from a replica or server in operation 502. It is then determined whether this is the first acknowledgment received for this connection in operation 504. Since the initial start packet sent by the client to the server may have been forwarded to a plurality of replicas and the server, multiple acknowledgments may be received by the client gateway router. In this embodiment, each replica is configured to send an immediate acknowledgement to the client in response to the forwarded start packet (e.g., FIG. 4A). Since the client will then initially receive an acknowledgement from the replica or server that is located closest to the client, a connection is only established for the first received acknowledgment. Thus, a connection is likely established with the closest device that holds the client's requested data.

When the received acknowledgement is the first acknowledgment received by the client gateway router, a translation table entry is obtained for this connection in operation 506. The translation table contains identification information previously saved by the client gateway router when the start packet was initially sent to the server. This translation table is used to determine whether the destination of the original start packet is now the source of the acknowledgment in operation 508. This is done by matching the identification information in the translation table with corresponding identification information within the acknowledgement packet. For example, the client IP destination address and client destination port number of the acknowledgement packet are matched to a previously stored client source IP address and client source port number of a start packet within the translation table. When a match is found, it is then determined whether the source IP address of the acknowledgment packet is the same as the server destination IP address that was saved with the client source IP address and client port number of the matching entry within the translation table.

If the server is not the source, the entry is updated for this connection in the translation table with the replica's address in operation 510. In other words, the server IP address is associated with the replica IP address for this connection. The translation table may then be utilized by the client gateway router to appropriately translate addresses of packets that are subsequently sent from the client to the replica and from the replica to the client. After the entry is updated, the client gateway router replaces the replica source address with the server source address associated with the current connection and forwards the acknowledgment packet to the client in operation 512.

If the server is the source of the acknowledgement packet, the entry may be deleted for this connection from the translation table in operation 516. That is, an address translation will not be necessary for packets sent between the client and the original web server (e.g., 110). If this is not the first acknowledgment for this connection, a reset is sent to the source of the acknowledgment in operation 514. That is, connections are terminated for replicas that send acknowledgements that are received after the first acknowledgement for a particular connection. Since the duration of time between the act of sending a start packet and act of receiving an acknowledgement is generally proportional to the distance between the client and the sender of the acknowledgement, connections are likely terminated for replicas that are located at a greater distance from the client than the sender of the first received acknowledgement.

Figure 6A:
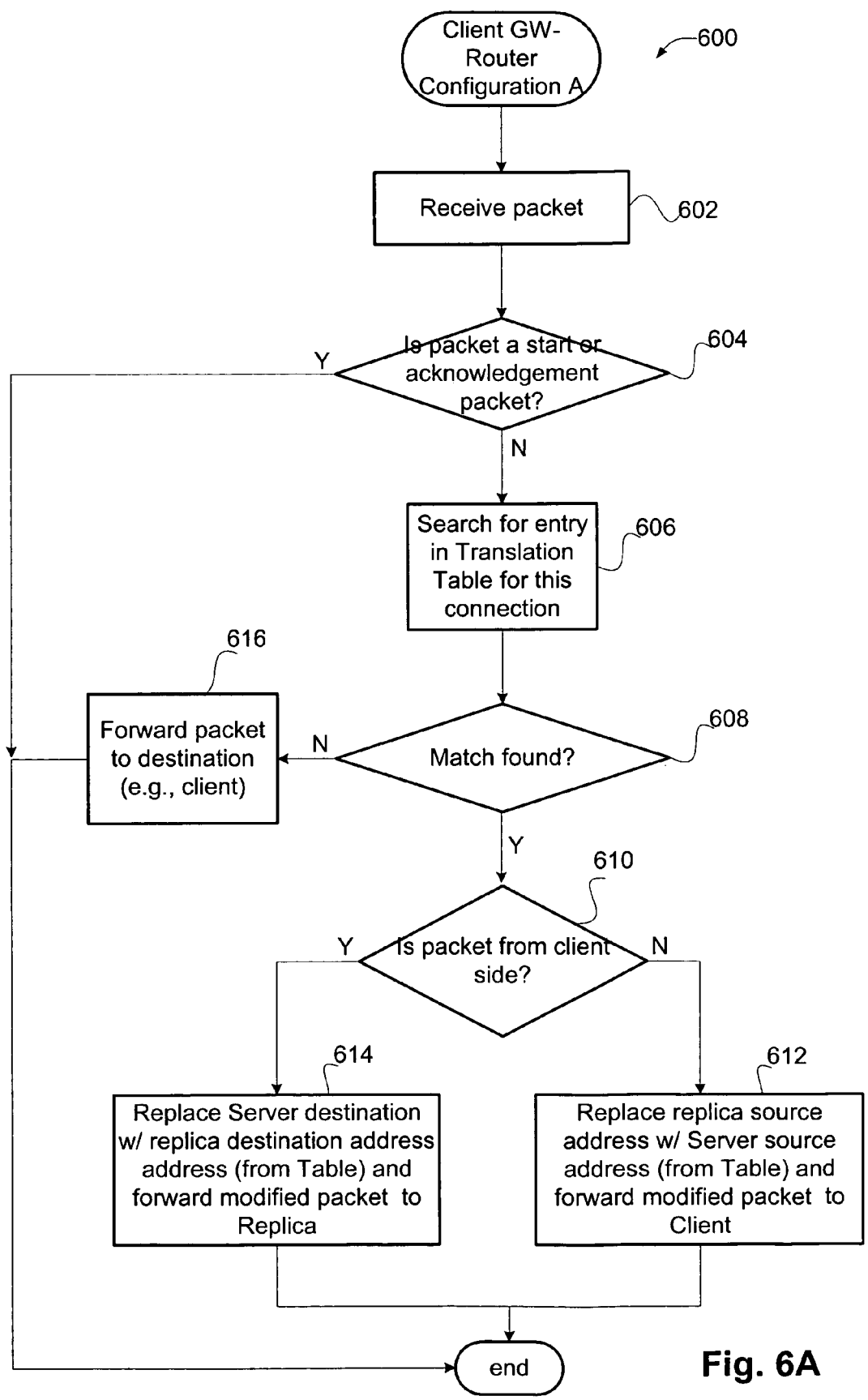
FIG. 6A illustrates a procedure implemented on the client gateway router for handling packets to and from the client and nearest replica or server in accordance with the first embodiment (configuration A) of the present invention.

FIG. 6A illustrates a technique 600 implemented on the client gateway router 106 for handling packets to and from the client 102a and the nearest replica 112a in accordance with the first embodiment of the present invention. After a connection is established by sending a first acknowledgment to the client, data may then pass back and forth between the client and the nearest replica. In general terms, the client gateway router allows the client and nearest replica to efficiently exchange data. Preferably, the data exchange is also performed transparently with respect to the client.

Initially, the client gateway router receives a packet in operation 602. It is first determined whether the packet is a start packet or an acknowledgment packet in operation 604. If the packet is a start packet or an acknowledgment packet, procedure 600 ends. Several embodiments of techniques for handling a start packet or an acknowledgment packet are described above with respect to FIGS. 2 and 5A.

If the packet is not a start or acknowledgment packet, the client gateway router searches for the entry in the translation table for this connection in operation 606. For example, the packet's destination IP address and destination port number is compared to each entry of client IP address and client port number within the translation table. It is then determined whether a match was found in operation 608. If an entry matches, the matching entry will also contain a corresponding replica address, which will be used in a translation procedure. If there is no match, the packet is simply forwarded to its destination in operation 616. For example, there may not be a match when the first received acknowledgement originated from the original destination server 110, instead of a replica.

When a match is found, it is then determined whether the packet is from the client side in operation 610. In other words, it is determined whether the packet is being sent from the client to a destination server. If the packet is from the client side, the client gateway router replaces the server destination address with the replica destination address of the matching entry that was obtained from the translation table and the "translated" packet is forwarded to the replica. If the packet is not from the client side, the client gateway router replaces the replica source address with the server source address of the matching entry from the translation table and forwards the packet to the client in operation 612. In other words, the client gateway router may be configured to perform a Network Address Translation (NAT) procedure on packets subsequently received after the acknowledgement packet. The packet handling procedure 600 then ends.

Configuration A (e.g., the client gateway router performs a NAT) has several associated advantages. For example, the client gateway router is aware of who sent the packet and is able to match the sending replica to the original destination server. In effect, the client server is able to verify the authentication of the replica by matching the source IP address and source port number of the start packet with the destination IP address and destination port number of the acknowledgement packet and subsequent packets sent by a nearest replica. The values of these two addresses are typically unique.

Although configuration A provides a relatively secure mechanisms for traffic transmission, it does require a significant amount of overhead, especially when translating data sent from a replica to the client since this data tends to be quite large (e.g., web content). Accordingly, the present invention may be implemented in any number of configurations to achieve efficient traffic handling between a client and a nearest replica (or the destination server if it is closer to the client than the other replicas), while minimizing or eliminating the overhead penalty of the configuration A implementation. In sum, the above described configuration A replica and client gateway techniques are not meant to limit the scope of the invention.

Figure 4B:
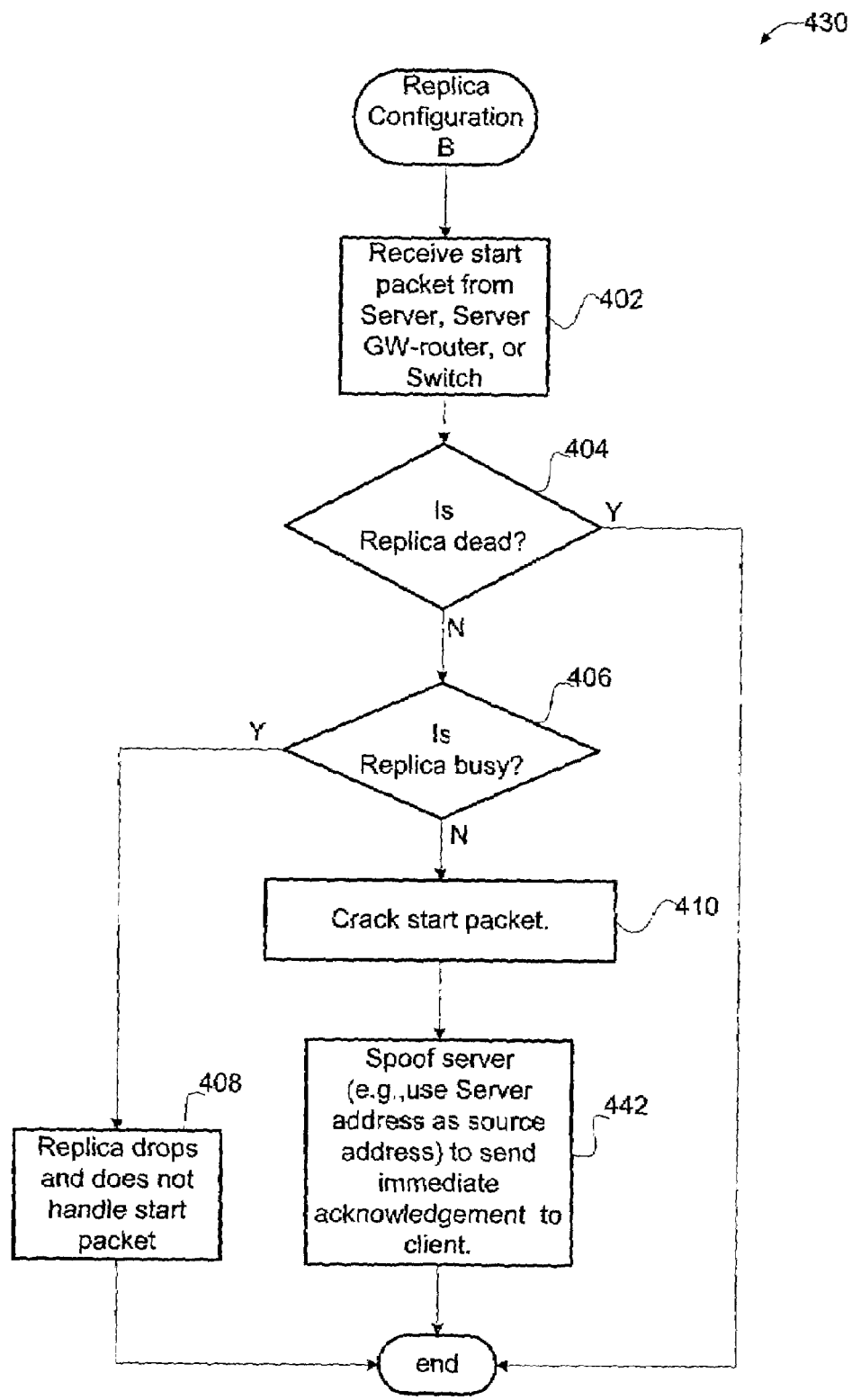
FIG. 4B is a flowchart illustrating a procedure implemented on a replica in accordance with a second embodiment (herein referred to as configuration B) of the present invention.

FIG. 4B is a flowchart illustrating a procedure 430 implemented on a replica in accordance with a second embodiment (herein referred to as configuration B) of the present invention. Operations 402 through 410 are common to both configuration A and configuration B replicas. However, after the start packet is cracked in operation 410, a different operation is performed in configuration B. Rather than send an immediate acknowledgment packet having a client destination address and replica source address to the client as done by the configuration A replica of FIG. 4A, the configuration B replica spoofs the server when sending an immediate acknowledgment to the client (see operation 442). That is, the configuration B replica encapsulates its acknowledgement response, which includes a replica source address and a client destination address, with the server source IP address and the client destination IP address.

Figure 5B:
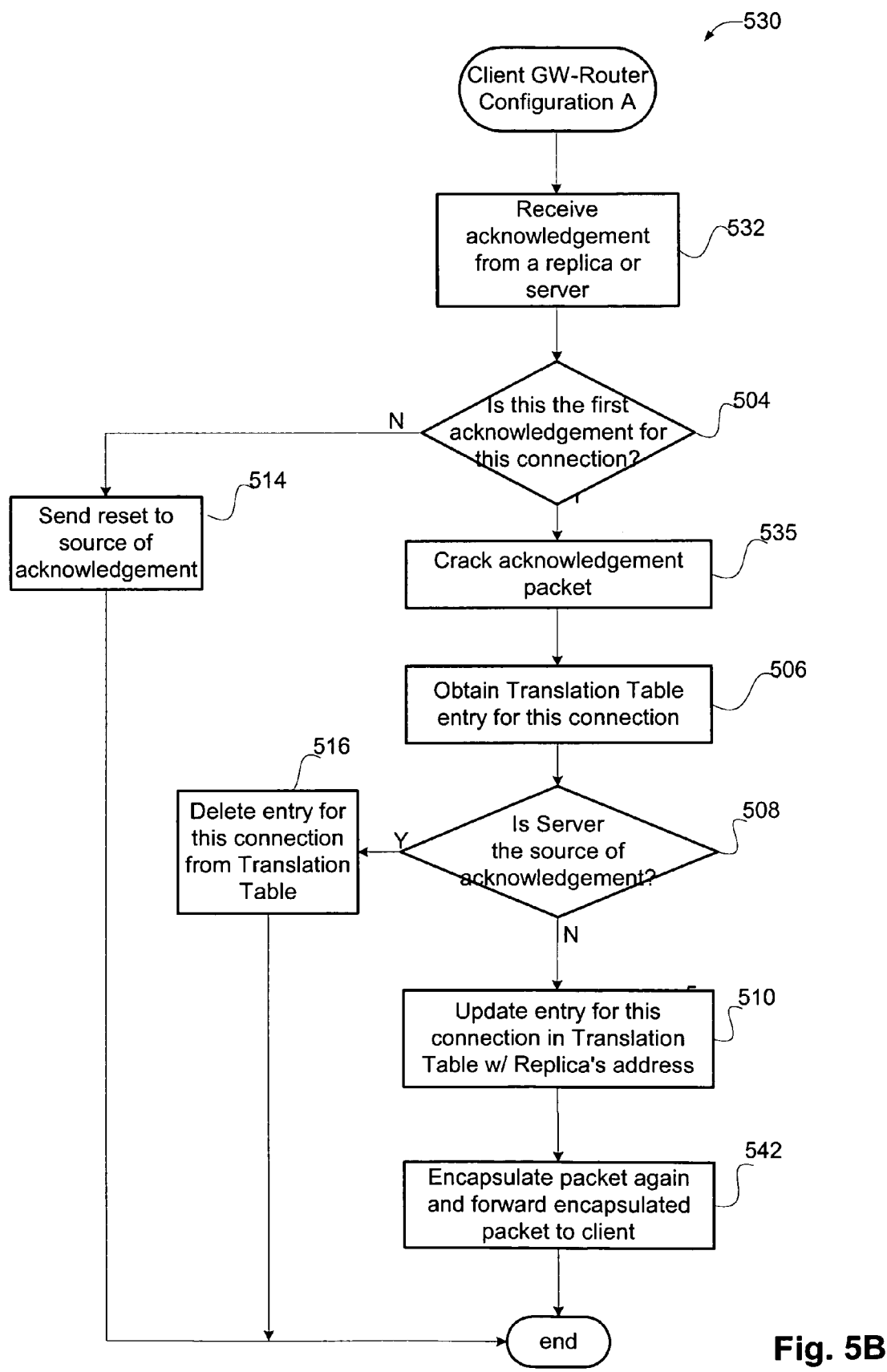
FIG. 5B is a flowchart illustrating a procedure implemented on the client gateway router in accordance with the second embodiment (configuration B) of the present invention.

FIG. 5B is a flowchart illustrating a procedure implemented on the client gateway router with the second embodiment (i.e., configuration B) of the present invention. Initially, the client gateway router receives an acknowledgement packet that originates supposedly from the original destination server (e.g., 110 of FIG. 1) in operation 532. That is, the acknowledgment packet appears to be from the server since a replica is spoofing the original destination server. Of course, the acknowledgement packet may really be from the original server if the server is closer to the client than the other replicas. Operations 504 and 506 through 516 are common to both configuration A and configuration B replicas. That is, it is determined whether the packet is a first acknowledgement and whether the real source of the acknowledgement is the original destination server.

However, prior to determining whether the packet originates from the original destination server, the acknowledgement packet is first cracked in operation 535 if the acknowledgement packet was encapsulated (e.g., by a replica). When it is determined that the real source is not the original destination server, the translation table is updated so that the replica source address of the cracked acknowledgement packet is associated with the original destination server in operation 510. The cracked acknowledgement packet is then re-encapsulated with the client destination address and original server source address in operation 542 so as to spoof the server. The configuration B gateway router procedure for handling acknowledgement packets then ends.

Figure 6B:
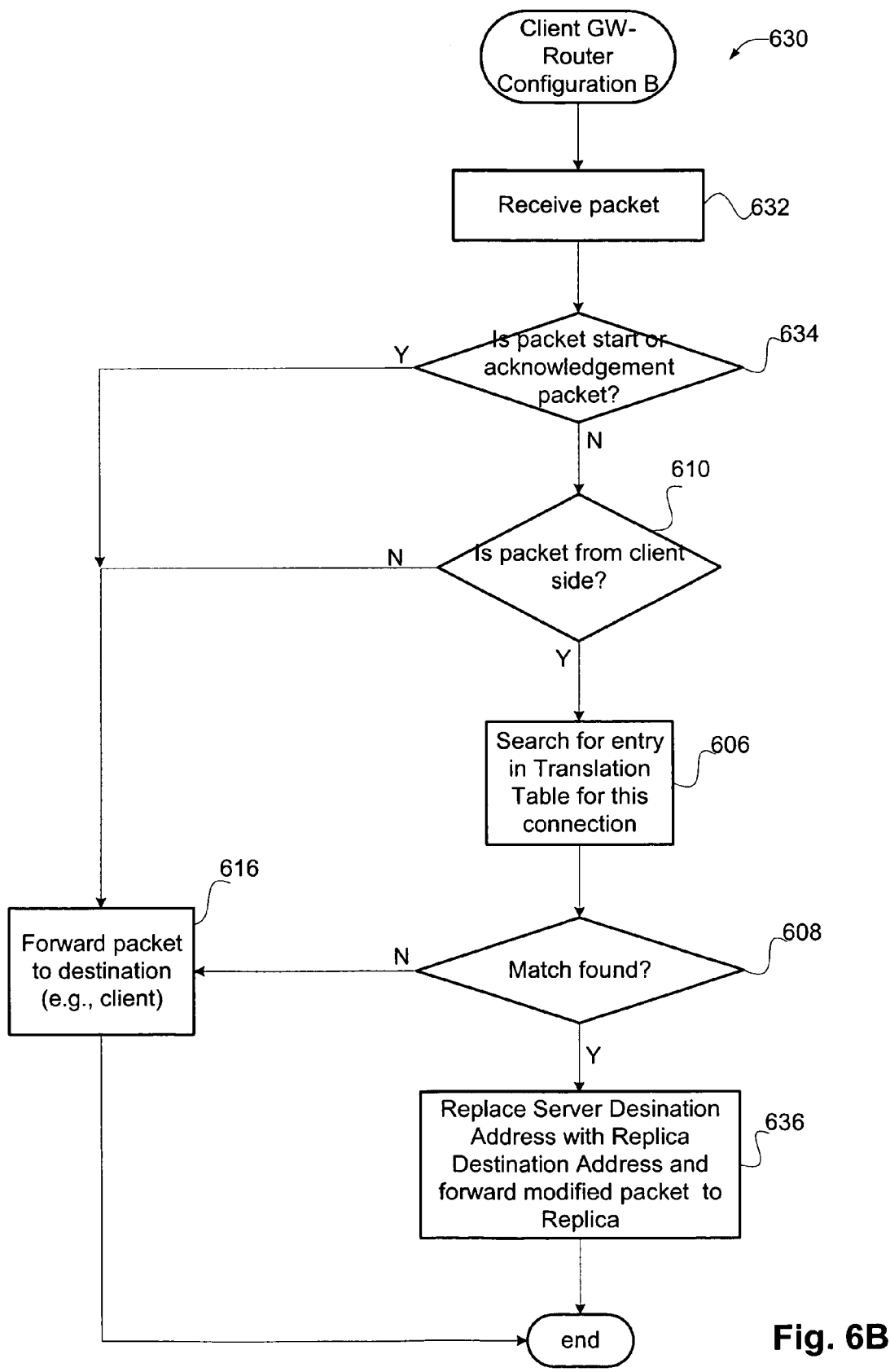
FIG. 6B illustrates a procedure implemented on the client gateway router for handling packets to and from the client and nearest replica or server in accordance with the first embodiment (configuration B) of the present invention.

FIG. 6B illustrates a technique 630 implemented on the client gateway router 106 for handling packets to and from the client 102a and the nearest replica 112a in accordance with the second embodiment (configuration B) of the present invention. Initially, a packet is received in operation 632. The packet may be sent from the client to the server or from a replica (spoofing a server) or the server to the client. Operations 606 through 610, and 616 are common to both configuration A and configuration B replicas. However, operations 606 and 608 are not performed when the packet is not from the client side. In general terms, the configuration B gateway server only translates packets sent from the client side to the replica, and not sent from the replica to the client. Thus, the client gateway router does not search within the translation table for entries corresponding to packets that do not originate from the client side. However, acknowledgement packets that do not originate from the client side are an exception to this rule as shown in FIG. 5B (i.e., the translation table is searched and an entry may be updated). When the packet is from the client side and a match is found in the translation table, the configuration B gateway router simply replaces the server destination address with the corresponding replica destination address and forwards the modified packet to the replica in operation 636. The procedure 630 then ends for this received packet.

Although the configuration B implementation is more efficient then the configuration A implementation since only packets sent from the client side are translated, this technique may not be acceptable under certain conditions. For example, since a replica spoofs the server, the gateway router may inadvertently initiate reset procedures for packets sent from the replica to the client. The client gateway router may send a reset when the packet is coming into a different port number than the original start packet for this connection. In this situation, the client gateway router may be configured to send a reset to inhibit hackers from breaking into a connection by masquerading as the intended destination server.

Figure 4C:
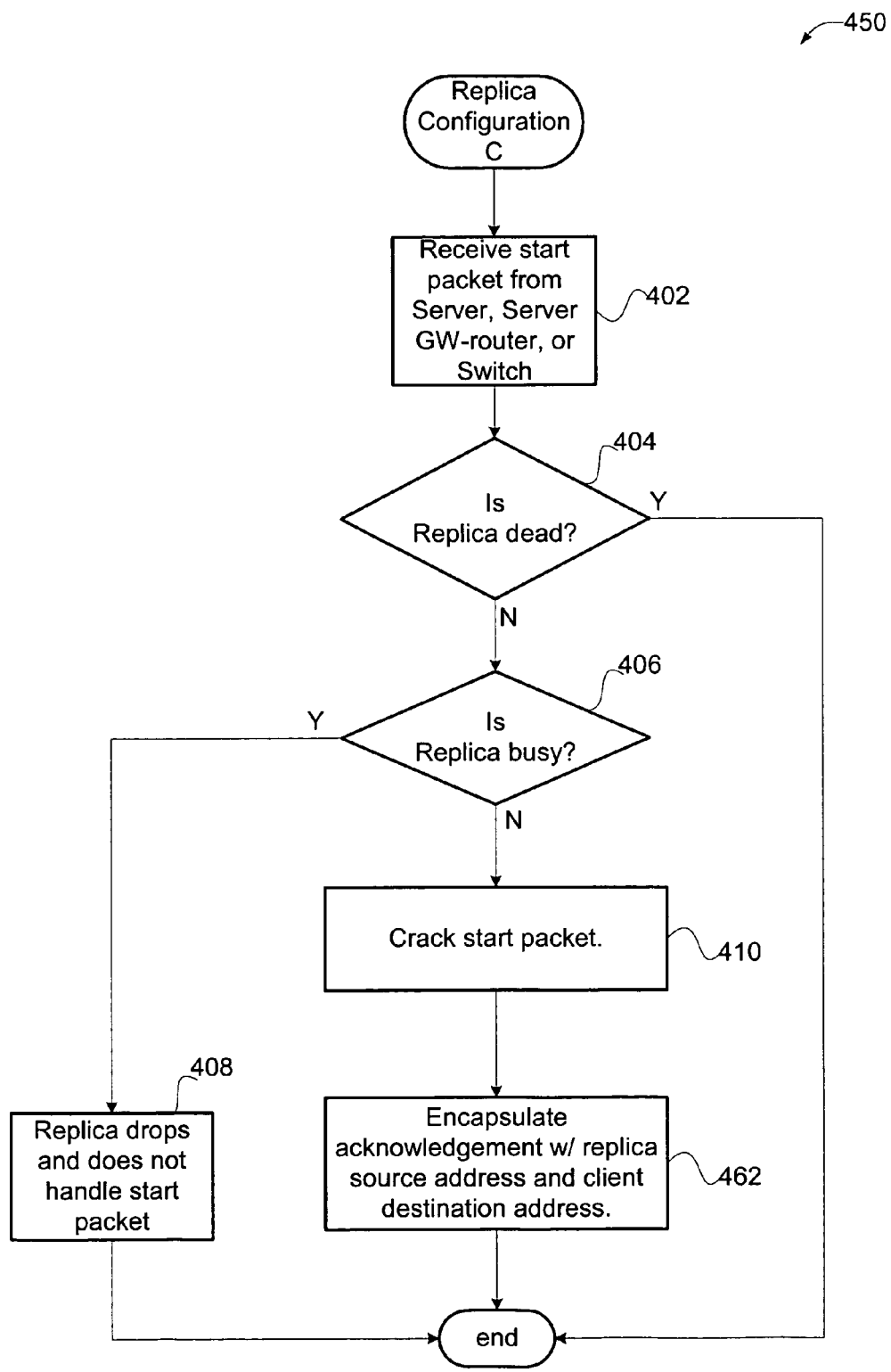
FIG. 4C is a flowchart illustrating a procedure that is implemented on a replica in accordance with a third embodiment (herein referred to as configuration C) of the present invention.

FIG. 4C is a flowchart illustrating a procedure 450 that is implemented on a replica in accordance with a third embodiment (herein referred to as configuration C) of the present invention. Operation 402 through 410 are common to FIGS. 4C, 4B, and 4A and are described above. However, after the start packet is cracked in operation 410, an acknowledgment is encapsulated with the replica source address and client destination address and sent to the client in operation 462. That is, the server source address and client destination address are encapsulated. The replica configuration C procedure 450 then ends.

Figure 5C:
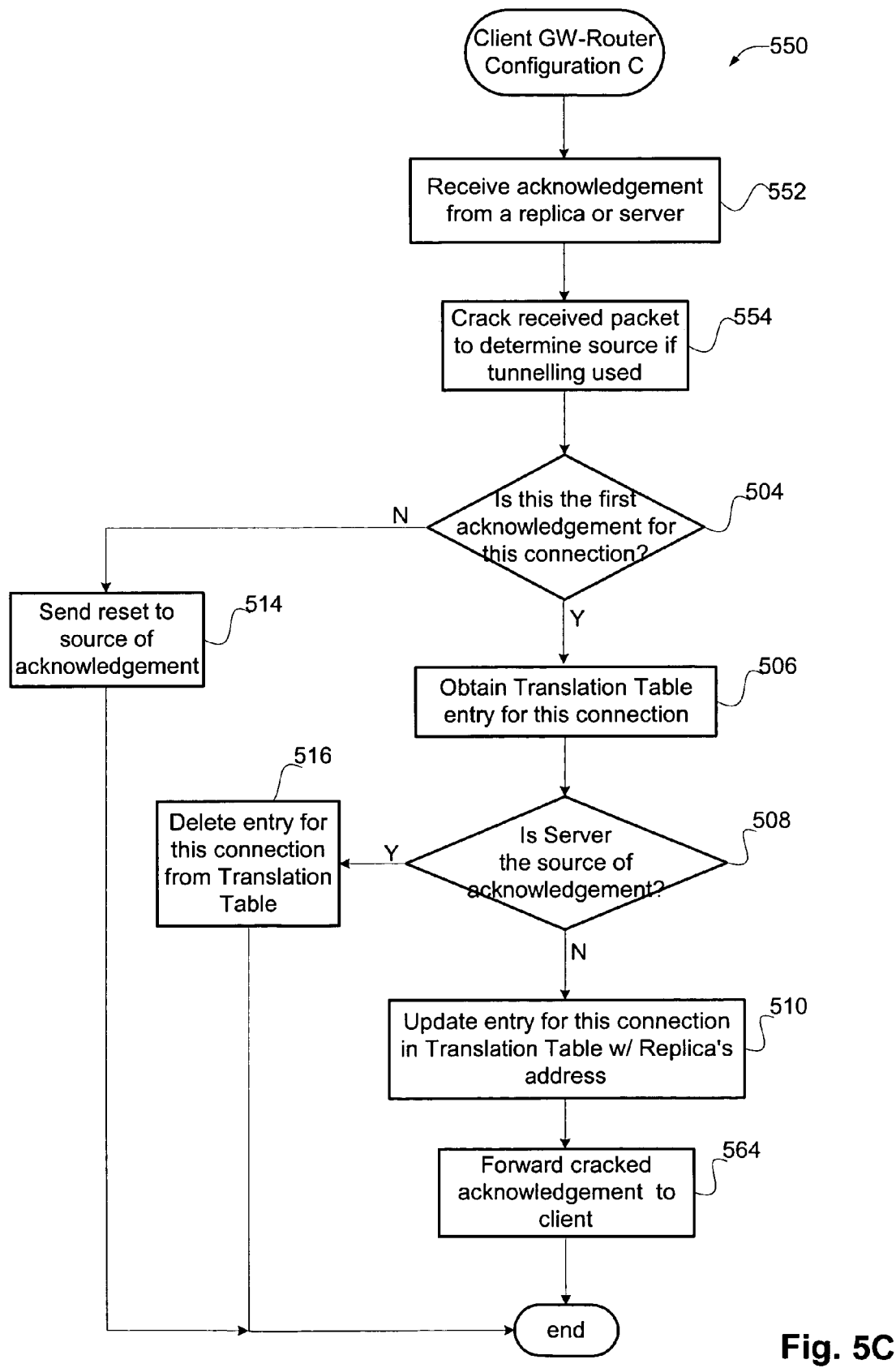
FIG. 5C is a flowchart illustrating a procedure implemented on the client gateway router in accordance with the second embodiment (configuration C) of the present invention.

FIG. 5C is a flowchart illustrating a procedure 550 implemented on the client gateway router. In general terms, the client gateway router performs tunneling on packets sent from a replica to the client. Initially, the client gateway router receives an acknowledgement packet from the original destination server (e.g., 110 of FIG. 1) or a replica in operation 552. The received acknowledgement is then cracked in operation 554 if the acknowledgement has been encapsulated (e.g., by a replica).

Operations 504 through 516 are common to both configuration A and configuration C replicas. That is, it is determined whether the acknowledgement is the first received acknowledgement and whether the source of the acknowledgement is not the original destination server. If these conditions are met, the translation table is updated by associating the replica's address with original destination server and the cracked acknowledgment is then forwarded to the client in operation 564. The configuration C procedure 550 then ends.

Figure 6C:
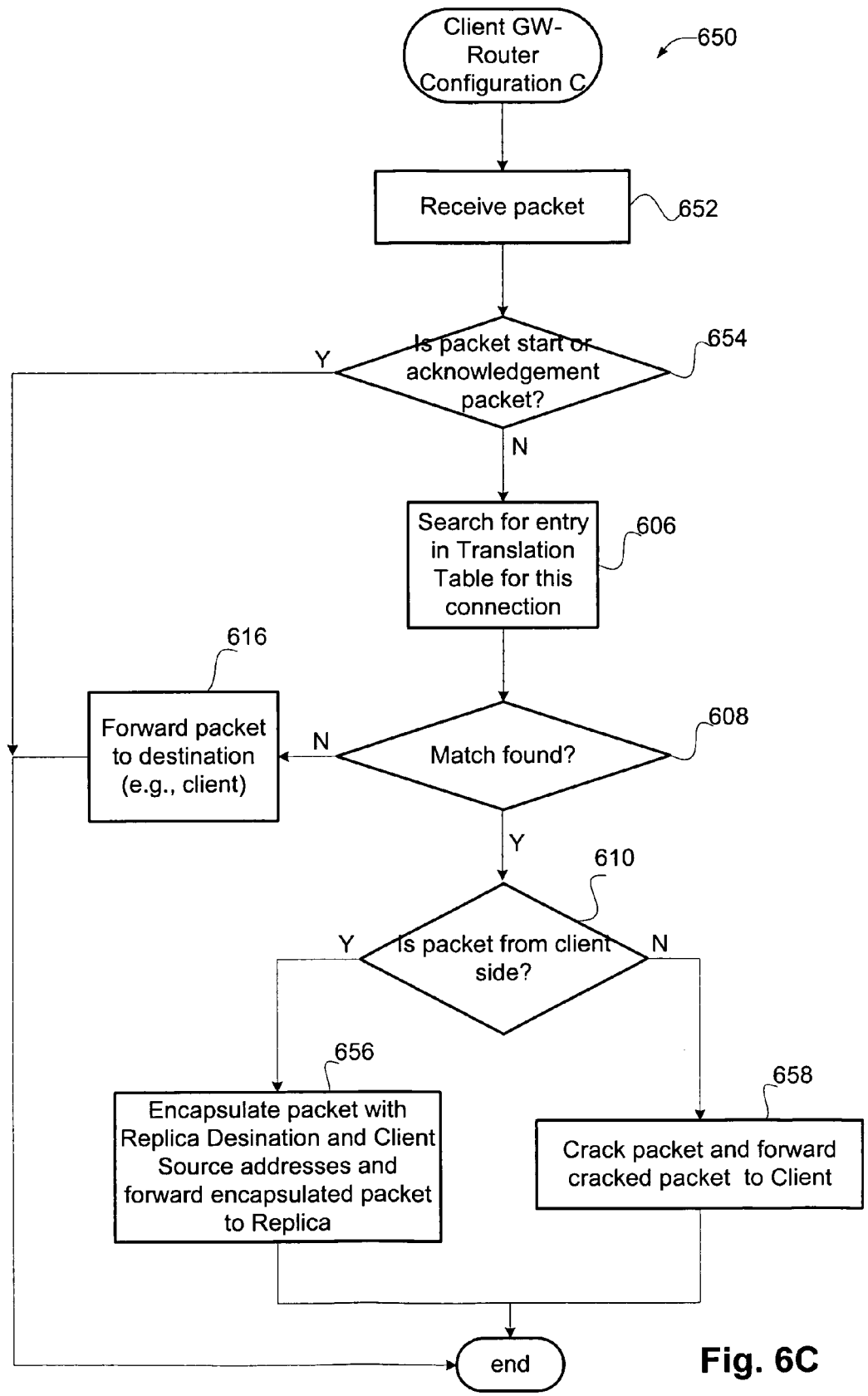
FIG. 6C illustrates a procedure implemented on the client gateway router for handling packets to and from the client and nearest replica or server in accordance with the first embodiment (configuration C) of the present invention.

FIG. 6C is a flowchart illustrating a procedure 650 implemented on the client gateway router for handling packets after a connection has been established between a client and a replica or a server in accordance with one embodiment of the present invention. Initially, a packet is received in operation 652. The packet may be sent from the client to the server or from a replica or the server to the client. Operations 606 through 610, and 616 are common to both configuration A and configuration C replicas. That is, when a packet is not a start or acknowledgement packet, the client gateway router searches for an entry within the translation table that corresponds to the packet. If there is a match found, it is then determined whether the packet is from the client side in operation 610. If the packet is from the client side, the packet is encapsulated with the replica IP destination address and client's source IP address and the encapsulated packet is then forwarded to the replica in operation 656. If the packet is not from the client side, the packet is merely cracked and forwarded to the client in operation 658. The configuration C procedure 650 then ends for this received packet.

Since packets going from the client to the replica (or server) are only modified and packets going to the client are merely cracked, the configuration C technique provides an efficient mechanisms for shuttling traffic back and forth between a client and a closest replica. Since packets going to the client from the replica tend to be much larger than the traffic going from the client to the replica, encapsulation will likely be performed on the smaller packets and not the larger packets. Since encapsulation requires more resources than simply cracking a packet, the configuration C technique will likely result in the utilization of less resource than, for example, the configuration A technique that modifies packets going both to and from the client. Additionally, since packets from the replica are cracked by the client gateway router, the gateway router can verify the authenticity of each packet (e.g., by comparing the destination port number of the cracked packet to the source port number of the corresponding start packet).

Generally, portions of the traffic redirection techniques of the present invention may be implemented on software and/or hardware. For example, they can be implemented in an operating system kernel, in a separate user process, in a library package bound into network applications, on a specially constructed machine, or on a network interface card. In a specific embodiment of this invention, a technique of the present invention is implemented in software such as an operating system or in an application running on an operating system.

A software or software/hardware hybrid traffic redirection system of this invention is preferably implemented on a general-purpose programmable machine selectively activated or reconfigured by a computer program stored in memory. The programmable machine may be in the form of a general purpose computer that is configured to implement a cache system. The computer system generally includes a memory, processor, and network interface modules.

Such programmable machine may also be a network device designed to handle network traffic. Such network devices typically have multiple network interfaces including frame relay and ISDN interfaces, for example. Specific examples of such network devices include routers and switches. For example, the traffic redirection systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, a traffic redirection system may be implemented on one or more general-purpose network host machine such as a personal computer or workstation. Further, techniques of the invention may be at least partially implemented on a card (e.g., an interface card) for a network device or a general-purpose computing device.

Referring now to FIG. 7, a router 10 suitable for implementing portions of the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for determining the tasks described above for the client gateway router, the web server, the switch, the server gateway router, or each replica. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or bucket allocation and assignment mechanisms described herein. The program instructions may control the operation of an operating system and/or one or more applications, for example. The memory or memories may also be configured to store the above described Translation Table.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of

What is claimed is:

1. A method of facilitating redirection of traffic between a server and a client to between the client and a selected one from a plurality of replicas, the method comprising:

receiving a packet from a client, the packet having a destination identifier associated with a server;

when the packet is a start packet, at the client side, adding a tag to the start packet to indicate that the start packet is to be forwarded by a device other than a client side device to a plurality of replicas that each duplicates the data content of the server, wherein the tag is an option byte having one of two states that indicate whether redirection is permissible or impermissible;

storing the destination identifier of the start packet;

after storing the destination identifier of the start packet and tagging the start packet, sending the start packet to the server;

for a first acknowledgement packet associated with the start packet that is received first, storing and associating a source identifier of the first acknowledgement packet with the stored destination identifier of the start packet;

after storing and associating the source identifier of the first acknowledgement packet, sending the first acknowledgement packet to the client;

prior to storing and associating the source identifier of the first acknowledgement packet, cracking the first acknowledgement packet to obtain the source identifier when the first acknowledgement packet has been encapsulated;

when cracked, encapsulating the cracked acknowledgement packet with the destination identifier stored for the associated start packet, wherein the encapsulated first acknowledgement packet is sent to the client; and when a second acknowledgement packet associated with the start packet is received after the first acknowledgement packet, inhibiting sending of the second acknowledgement to the client.

2. A method as recited in claim 1, further comprising:

when a subsequent packet associated with the start packet is received that is not a start packet or an acknowledgement packet, replacing a destination identifier of the subsequent packet with the source identifier stored for the acknowledgement packet when the subsequent packet originates from the client; and forwarding the altered subsequent packet to its destination.

3. A method as recited in claim 2, wherein the subsequent packet is only modified when the destination identifier of the subsequent packet equals the destination identifier stored for the associated start packet.

4. A method as recited in claim 1, wherein the start packet is only tagged when the start packet is associated with web data, and the method further comprising sending the start packet to the server without the tag when the start packet is not associated with web data.

5. A method as recited in claim 4, wherein the start packet is associated with web data when the start packet has a destination port utilized for accessing web data.

6. A computer system operable to facilitate redirection of traffic between a server and a client to between the client and a selected one from a plurality of replicas, the computer system comprising:

a memory; and a processor coupled to the memory, wherein at least one of the memory and the processor are adapted to provide:

receiving a packet from a client, the packet having a destination identifier associated with a server;

when the packet is a start packet, at the client side, adding a tag to the start packet to indicate that the start packet is to be forwarded by a device other than a client side device to a plurality of replicas that each duplicates the data content of the server, wherein the tag is an option byte having one of two states that indicate whether redirection is permissible or impermissible;

storing the destination identifier of the start packet;

after storing the destination identifier of the start packet and tagging the start packet, sending the start packet to the server;

for a first acknowledgement packet associated with the start packet that is received first, storing and associating a source identifier of the first acknowledgement packet with the stored destination identifier of the start packet;

after storing and associating the source identifier of the first acknowledgement packet, sending the first acknowledgement packet to the client;

prior to storing and associating the source identifier of the first acknowledgement packet, cracking the first acknowledgement packet to obtain the source identifier when the first acknowledgement packet has been encapsulated;

when cracked, encapsulating the cracked acknowledgement packet with the destination identifier stored for the associated start packet, wherein the encapsulated first acknowledgement packet is sent to the client; and when a second acknowledgement packet associated with the start packet is received after the first acknowledgement packet, inhibiting sending of the second acknowledgement to the client.

7. A computer system as recited in claim 6, wherein at least one of the memory and the processor are further adapted to provide:

when a subsequent packet associated with the start packet is received that is not a start packet or an acknowledgement packet, replacing a destination identifier of the subsequent packet with the source identifier stored for the acknowledgement packet when the subsequent packet originates from the client; and forwarding the altered subsequent packet to its destination.

8. A computer system as recited in claim 6, wherein the subsequent packet is only modified when the destination identifier of the subsequent packet equals the destination identifier stored for the associated start packet.

9. A computer system as recited in claim 6, wherein the start packet is only tagged when the start packet is associated with web data, and the method further comprising sending the start packet to the server without the tag when the start packet is not associated with web data.

10. A computer system as recited in claim 9, wherein the start packet is associated with web data when the start packet has a destination port utilized for accessing web data.

11. A computer program product for facilitating redirection of traffic between a server and a client to between the client and a selected one from a plurality of replicas, the computer program product comprising:

at least one computer readable medium;

computer program instructions stored within the at least one computer readable product configured for:

receiving a packet from a client, the packet having a destination identifier associated with a server;

when the packet is a start packet, at the client side, adding a tag to the start packet to indicate that the start packet is to be forwarded by a device other than a client side device to a plurality of replicas that each duplicates the data content of the server, wherein the tag is an option byte having one of two states that indicate whether redirection is permissible or impermissible;

storing the destination identifier of the start packet;

after storing the destination identifier of the start packet and tagging the start packet, sending the start packet to the server;

for a first acknowledgement packet associated with the start packet that is received first, storing and associating a source identifier of the first acknowledgement packet with the stored destination identifier of the start packet;

after storing and associating the source identifier of the first acknowledgement packet, sending the first acknowledgement packet to the client;

prior to storing and associating the source identifier of the first acknowledgement packet, cracking the first acknowledgement packet to obtain the source identifier when the first acknowledgement packet has been encapsulated;

when cracked, encapsulating the cracked acknowledgement packet with the destination identifier stored for the associated start packet, wherein the encapsulated first acknowledgement packet is sent to the client; and when a second acknowledgement packet associated with the start packet is received after the first acknowledgement packet, inhibiting sending of the second acknowledgement to the client.

12. A computer program product as recited in claim 11, the at least one computer readable product further configured for:

when a subsequent packet associated with the start packet is received that is not a start packet or an acknowledgement packet, replacing a destination identifier of the subsequent packet with the source identifier stored for the acknowledgement packet when the subsequent packet originates from the client; and forwarding the altered subsequent packet to its destination.

13. A computer program product as recited in claim 12, wherein the subsequent packet is only modified when the destination identifier of the packet equals the destination identifier of the start packet.

14. A computer program product as recited in claim 11, wherein the start packet is only tagged when the start packet is associated with web data, and the method further comprising sending the start packet to the server without the tag when the start packet is not associated with web data.

15. A computer program product as recited in claim 14, wherein the start packet is associated with web data when the start packet has a destination port utilized for accessing web data.

16. A method of facilitating redirection of traffic between a server and a client to between the client and a nearest replica selected from a plurality of replicas, the method comprising:

at the client side, receiving a packet that is traveling between a client and a server or between the client and a replica;

when the received packet is a start packet that is traveling from the client to the server, at the client side, adding a tag to the start packet to indicate that the start packet is to be forwarded by a device other than a client side device to a plurality of replicas that each duplicates the data content of the server, wherein the tag is an option byte having one of two states that indicate whether redirection is permissible or impermissible;

for the received packet that is an acknowledgement packet that is received first and spoofs the server, obtaining a source identifier of the replica from the acknowledgement when the acknowledgement originates from the replica and then sending the acknowledgement packet to the client;

for the received packet that is an acknowledgement packet that is not received first and spoofs the server, inhibiting sending of the second acknowledgement to the client; and when the received packet is a subsequent packet received after the start packet and the acknowledgement packet, altering the subsequent packet so that it goes to the replica when the subsequent packet originates from the client, wherein the alteration is based on the obtained source identifier from the acknowledgement packet.

17. A method as recited in claim 16, wherein the source identifier of the replica is obtained from the acknowledgement packet by cracking the acknowledgement packet when it is encapsulated.

18. A method as recited in claim 17, further comprising re-encapsulating the cracked acknowledgement packet prior to sending it to the client.

19. A method as recited in claim 16, wherein the subsequent packet is altered by replacing the subsequent packet's destination identifier with a destination identifier of the start packet.

20. A method as recited in claim 16, wherein the subsequent packet is altered by encapsulating the subsequent packet with a destination identifier of the start packet.

21. A computer system operable to facilitate redirection of traffic between a server and a client to between the client and a nearest replica selected from a plurality of replicas, the computer system comprising:

a memory; and a processor coupled to the memory, wherein at least one of the memory and the processor are adapted to provide:

at the client side, receiving a packet that is traveling between a client and a server or between the client and a replica;

when the received packet is a start packet that is traveling from the client to the server, at the client side, adding a tag to the start packet to indicate that the start packet is to be forwarded by a device other than a client side device to a plurality of replicas that each duplicates the data content of the server, wherein the tag is an option byte having one of two states that indicate whether redirection is permissible or impermissible;

for the received packet that is an acknowledgement packet that is received first and spoofs the server, obtaining a source identifier of the replica from the acknowledgement when the acknowledgement originates from the replica and then sending the acknowledgement packet to the client;

for the received packet that is an acknowledgement packet that is not received first and spoofs the server, inhibiting sending of the second acknowledgement to the client; and when the received packet is a subsequent packet received after the start packet and the acknowledgement packet, altering the subsequent packet so that it goes to the replica when the subsequent packet originates from the client, wherein the alteration is based on the obtained source identifier from the acknowledgement packet.

22. A computer system as recited in claim 21, wherein the source identifier of the replica is obtained from the acknowledgement packet by cracking the acknowledgement packet when it is encapsulated.

23. A computer system as recited in claim 22, further comprising re-encapsulating the cracked acknowledgement packet prior to sending it to the client.

24. A computer system as recited in claim 21, wherein the subsequent packet is altered by replacing the subsequent packet's destination identifier with a destination identifier of the start packet.

25. A computer system as recited in claim 21, wherein the subsequent packet is altered by encapsulating the subsequent packet with a destination identifier of the start packet.

26. A computer program product for facilitating redirection of traffic between a server and a client to between a server and a client to between the client and a nearest replica selected from a plurality of replicas, the computer program product comprising:

at least one computer readable medium;

computer program instructions stored within the at least one computer readable product configured for:

at the client side, receiving a packet that is traveling between a client and a server or between the client and a replica;

when the received packet is a start packet that is traveling from the client to the server, at the client side, adding a tag to the start packet to indicate that the start packet is to be forwarded by a device other than a client side device to a plurality of replicas that each duplicates the data content of the server, wherein the tag is an option byte having one of two states that indicate whether redirection is permissible or impermissible;

for the received packet that is an acknowledgement packet that is received first and spoofs the server, obtaining a source identifier of the replica from the acknowledgement when the acknowledgement originates from the replica and then sending the acknowledgement packet to the client;

for the received packet that is an acknowledgement packet that is not received first and spoofs the server, inhibiting sending of the second acknowledgement to the client; and when the received packet is a subsequent packet received after the start packet and the acknowledgement packet, altering the subsequent packet so that it goes to the replica when the subsequent packet originates from the client, wherein the alteration is based on the obtained source identifier from the acknowledgement packet.

27. A computer program product as recited in claim 26, wherein the source identifier of the replica is obtained from the acknowledgement packet by cracking the acknowledgement packet when it is encapsulated.

28. A computer program product as recited in claim 27, the at least one computer readable product being further configured for re-encapsulating the cracked acknowledgement packet prior to sending it to the client.

29. A computer program product as recited in claim 26, wherein the subsequent packet is altered by replacing the subsequent packet's destination identifier with a destination identifier of the start packet.

30. A computer program product as recited in claim 26, wherein the subsequent packet is altered by encapsulating the subsequent packet with a destination identifier of the start packet.

31. An apparatus product for facilitating redirection of traffic between a server and a client to between the client and a selected one from a plurality of replicas, the apparatus comprising:

means for receiving a packet from a client, the packet having a destination identifier associated with a server;

means for when the packet is a start packet, at the client side, adding a tag to the start packet to indicate that the start packet should is to be forwarded by a device other than a client side device to a plurality of replicas that each duplicates the data content of the server, wherein the tag is an option byte having one of two states that indicate whether redirection is permissible or impermissible;

means for storing the destination identifier of the start packet;

means for after storing the destination identifier of the start packet and tagging the start packet, sending the start packet to the server;

means for, for a first acknowledgement packet associated with the start packet that is received first, storing and associating a source identifier of the first acknowledgement packet with the stored destination identifier of the start packet;

means for after storing and associating the source identifier of the first acknowledgement packet, sending the first acknowledgement packet to the client;

means for prior to storing and associating the source identifier of the first acknowledgement packet, cracking the first acknowledgement packet to obtain the source identifier when the first acknowledgement packet has been encapsulated;

means for when cracked, encapsulating the cracked acknowledgement packet with a source address associated with the packet, wherein the encapsulated first acknowledgement packet is sent to the client; and means for when a second acknowledgement packet associated with the start packet is received after the first acknowledgement packet, inhibiting sending of the second acknowledgement to the client.

32. An apparatus product for facilitating redirection of traffic between a server and a client to between the client and a nearest replica selected from a plurality of replicas, the apparatus comprising:

means for at the client side, receiving a packet that is traveling between a client and a server or between the client and a replica;

means for when the received packet is a start packet that is traveling from the client to the server, at the client side, adding a tag to the start packet to indicate that the start packet is to be forwarded by a device other than a client side device to a plurality of replicas that each duplicates the data content of the server, wherein the tag is an option byte having one of two states that indicate whether redirection is permissible or impermissible;

means for, for the received packet that is an acknowledgement packet that is received first and spoofs the server, obtaining a source identifier of the replica from the acknowledgement when the acknowledgement originates from the replica and then sending the acknowledgement packet to the client;

means for, for the received packet that is an acknowledgement packet that is not received first and spoofs the server, inhibiting sending of the second acknowledgement to the client; and means for when the received packet is a subsequent packet received after the start packet and the acknowledgement packet, altering the subsequent packet so that it goes to the replica when the subsequent packet originates from the client, wherein the alteration is based on the obtained source identifier from the acknowledgement packet.

* * * * *